United States Patent [19]

Brand et al.

[11] Patent Number: 4,767,941
[45] Date of Patent: Aug. 30, 1988

[54] METHOD FOR ERROR-PROTECTED ACTUATION OF THE SWITCHING DEVICES OF A SWITCHING STATION AND AN APPARATUS THEREOF

[75] Inventors: Klaus-Peter Brand, Wettingen; Jürgen Kopainsky, Brugg; Wolfgang Wimmer, Untersiggenthal, all of Switzerland

[73] Assignee: BBC Brown, Boveri & Co., Ltd., Switzerland

[21] Appl. No.: 930,643

[22] Filed: Nov. 13, 1986

[30] Foreign Application Priority Data

Nov. 14, 1985 [CH] Switzerland .......................... 4880/85

[51] Int. Cl.$^4$ ...................... H01H 47/00; H04M 3/22
[52] U.S. Cl. ..................................... 307/43; 307/113; 307/115; 379/12; 379/275; 340/826; 324/418
[58] Field of Search ............... 307/112, 115, 142, 113, 307/43; 364/140, 141, 142, 147; 361/190, 191, 192, 193; 379/1, 2, 12, 10, 26, 275, 277; 324/415, 418; 340/826, 825.18

[56] References Cited

U.S. PATENT DOCUMENTS

| | | | |
|---|---|---|---|
| 3,289,167 | 11/1966 | Swane | 324/418 X |
| 3,337,692 | 8/1967 | Bruglemans | 379/275 X |
| 3,480,735 | 11/1969 | Mnichowicz et al. | 379/275 X |
| 3,706,856 | 12/1972 | Grundy et al. | 340/826 |
| 3,809,822 | 5/1974 | Eddy et al. | 379/275 X |
| 3,825,701 | 7/1974 | Jacobs | 340/826 |
| 3,892,928 | 7/1975 | Casterline et al. | 379/12 |
| 3,919,504 | 11/1975 | Crosley et al. | 324/415 X |
| 3,922,499 | 11/1975 | Athas et al. | 379/275 X |
| 4,059,736 | 11/1977 | Perucca et al. | 379/2 X |
| 4,076,970 | 2/1978 | Lubarsky et al. | 379/10 X |
| 4,303,383 | 12/1981 | Black et al. | 307/115 X |
| 4,507,703 | 3/1985 | Blau et al. | 307/115 X |
| 4,516,076 | 5/1985 | Pillari et al. | 324/418 |
| 4,562,359 | 12/1985 | Herzig | 307/115 X |

FOREIGN PATENT DOCUMENTS 0103137 3/1984 European Pat. Off. .
0103151 3/1984 European Pat. Off. .

OTHER PUBLICATIONS

D. Lidgate et al.: "Electrical Interlock Design for Complex High-Power Switching Networks", pp. 152–158.
D. Lidgate et al.,: "Electrical Operational Interlocks for a Fossil-Fired Power Station Auxiliary System", pp. 317–323.

Primary Examiner—William M. Shoop, Jr.
Assistant Examiner—Paul Ip
Attorney, Agent, or Firm—Ostrolenk, Faber, Gerb & Soffen

[57] ABSTRACT

A method for error-protected switching operation of switching devices of a high-voltage switching station. The current operational state of the station is determined from the signals provided by position indicating contacts ($K_I$, $K_{II}$, $K_{III}$) of the switching devices. Using the obtained operational state, switching operation request commands (for example KA) are checked for release or blocking status by means of error-protected switching interlocking rules. In the case of changes in the topological configuration of the high-voltage switching station and/or in the case of changes of the error-protected switching interlocking rules, it is possible to adapt the basic method to these changes in a simple manner and without losing operational reliabilty. This is achieved by decoupling the topological configuration of the high-voltage switching station from the error-protected switching interlocking rules. To this end, the topological configuration of the high-voltage switching station and the error-protected switching interlocking rules are stored independently of each other. From current position indicating signals of the switching devices and the topological configuration, topological elements establishing the current operational state of the high-voltage switching station are formed by means of which the error-protected switching interlocking rules are interrogated for releasing or blocking a switching operation request commands (KE).

5 Claims, 5 Drawing Sheets

METHOD FOR ERROR-PROTECTED ACTUATION OF THE SWITCHING DEVICES OF A SWITCHING STATION AND AN APPARATUS THEREOF

BACKGROUND OF THE INVENTION

The invention is based on a method for error protected actuation of switching devices of a switching station.

Such a method is known, for example, from EP-A2-0 No. 103 137 the counterpart of which is U.S. Pat. No. 4,507,703. In the known method, position indicating signals of switching devices of the switchgear bay of a switching station having many switchgear bays are used for generating a digital map of the operational state of the switchgear bay by simulating a requested switching operation. The digital maps of the individual switchgear bays are then continuously and cyclicly interrogated and transferred to a central accumulator memory in which they are combined to form an overall map. This overall map is subsequently transferred to each switchgear bay and stored there until the next overall map arrives. When a switching operation is requested, a check is made for switching error protection interlocking conditions in the switchgear bay concerned by means of an overall map arriving subsequent to this request and, if the decision is negative, the requested switching operation is executed. Although this makes it possible to omit interlocking relays, interlocking cable trees and cross-cabling installations in a device for carrying out the aforementioned method, a failure of the central accumulator memory already blocks execution of this method.

SUMMARY OF THE INVENTION

The present invention achieves the object of specifying a method of the aforementioned type and an apparatus for carrying out this method which attain a high operational reliability and can be adapted in a simple manner to changes of the configuration of the switching station and/or of the switching-error protection interlocking rules.

The invention makes it possible to decouple the topological configuration of the switching station from the switching-error-protection interlocking rules. As a result of this decoupling, changes can be carried out in the topological configuration of the switching station without completely redesigning the previously used switching-error-protection scheme on account of the changed topological configuration. Instead, the previous switching-error protection can be set up again if only the changed topological arrangement of the switching station is covered by the switching-error-protection system, retaining the switching-error-protection interlocking rules already stored. Correspondingly, changes can be carried out in the switching-error-protection interlocking rules without completely redesigning the previously used switching-error protection.

BRIEF DESCRIPTION OF THE DRAWINGS

In the text which follows, an illustrative embodiment of the invention is explained in greater detail with the aid of the drawing, in which.

DETAILED DESCRIPTION OF THE DRAWINGS

Figure 1:
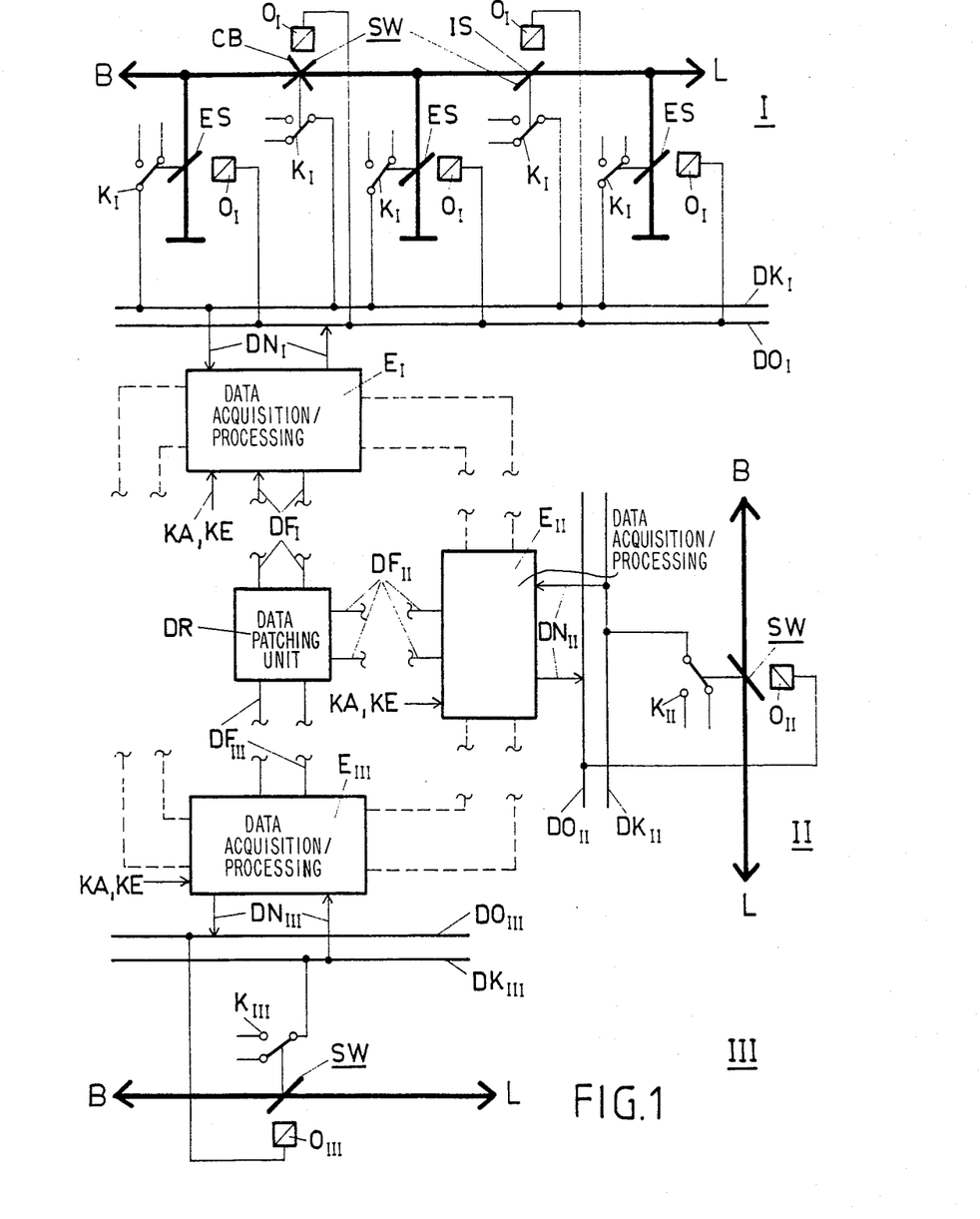
FIG. 1 shows a circuit diagram of the high-voltage switching station, consisting of three feeders and comprising a device for carrying out the method according to the invention for error-protected switching of the switching devices of this station.

The high-voltage switching station shown in FIG. 1 contains, for example, three feeders I, II and III. Each of these feeders is provided with high-voltage components, shown thickly drawn, such as busbars B, lines L and switching devices SW, and components, shown thinly drawn, for error-protected switching operation of the switching devices SW of this high-voltage switching station.

The high-voltage components of each of the three feeders I, II and III can have any arbitrary topological arrangement conforming to the regulations. Thus, for example, in feeder I, a circuit breaker CB is shown which is connected between the busbar B and the line L and which can be connected to the line L, or disconnected from it, via an isolator IS. In addition, three earthing switches ES are provided which in each case connect or disconnect one connection of the circuit breaker CB and of the isolator IS and the common connection of circuit breaker and isolator to earth or from earth, respectively. In the feeders II and III, the topology is only symbolically indicated by specifying in each case a busbar B, a switching device SW and a line L.

The switching devices SW have in each case position indicating contacts $K_I$, $K_{II}$, and $K_{III}$ providing signals which indicate the switching state of the associated switching device SW. The signals are supplied via a databus $DK_I$, $DK_I$ and DKIII associated with each feeder I, II and III, and local data links $ON_I$, $DN_{II}$ and $DN_{III}$ to the input of a data acquisition and data processing unit $E_I$, $E_{II}$ and $E_{III}$ associated with the respective feeder I, II and III. An output of each of the three data acquisition and data processing units acts in each case via a databus $DO_I$, $DO_{II}$ and $DO_{III}$ on operating means $O_I$, $O_{II}$ and $O_{III}$ of the switching devices SW of each of the feeders I, II and III.

The data acquisition and data processing units $E_I$, $E_I$ and $E_{III}$ have in each case another input and another output which are connected to a data patching unit DR via remote data links $DF_I$, $DF_{II}$, $DF_{III}$. This makes it possible to establish communication between the data acquisition and data processing units. In corresponding manner, communication between the data acquisition and data processing units can also be made possible by the fact that the data acquisition and data processing units are switched via remote data links in the form of a ring (drawn in dashes) or of a bus or are connected to each other meshed together in the form of a network. In addition, it is also possible to provide, instead of the distributed data acquisition and data processing units allocated to each of the feeders, a single data acquisition and data processing unit which receives and centrally processes the signals of the position indicating contacts of the switching devices of the feeders via remote data links and sends commands to the operating means of the switching devices of each of the feeders.

Each data acquisition and data processing unit also has an input which is supplied with signals associated with the switching operation request commands KA, KE signals by means of which operation of one of the switching devices SW of one of the feeders is to be effected.

Figure 2:
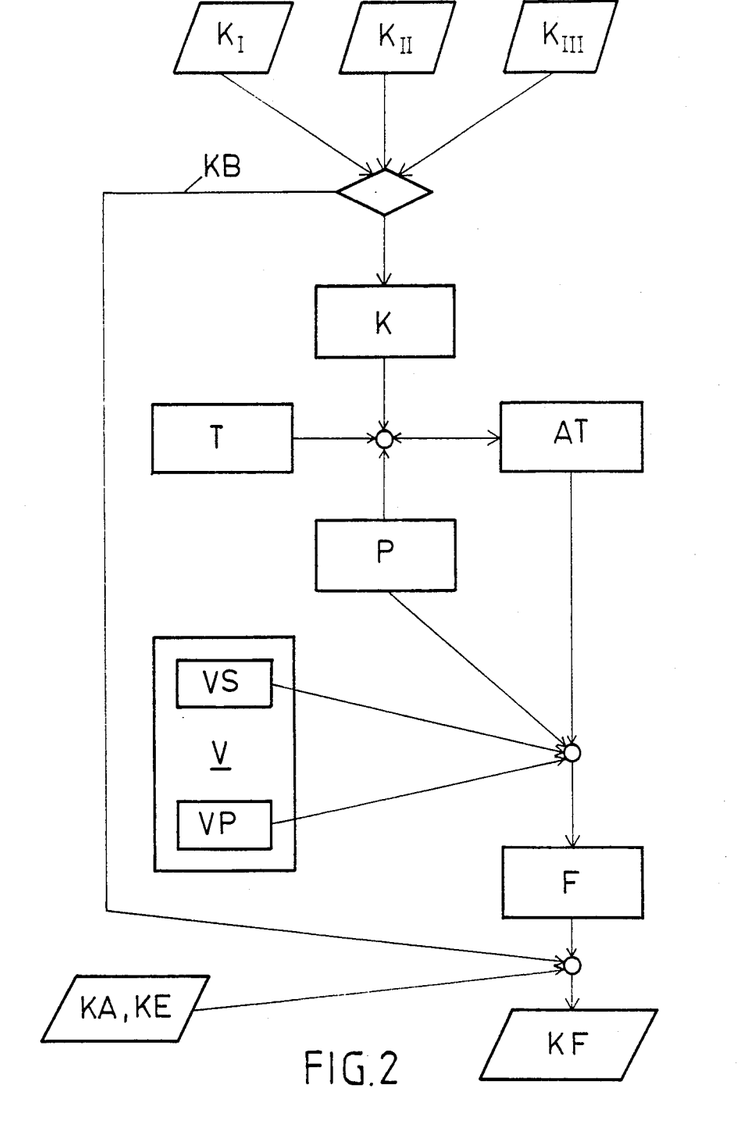
FIG. 2 is a data flow chart for the error-protected switching operation of the switching devices of the high-voltage switching station according to FIG. 1.

The current signals of the position indicating contacts $K_I$, $K_{II}$ and $K_{III}$ of each of the switching devices SW of the high-voltage switching station, reaching each of the data acquisition and data processing units $E_I$, $E_{II}$ and $E_{III}$, are stored in the respective data acquisition and data processing unit at K during a short period in which the position indicating contacts of all switching devices of the high-voltage switching station are interrogated, as is shown in FIG. 2. Before this, a check is made whether a signal is present which contains an undefined state of one of the switching devices SW, for example, a current operation or a failure. If such a signal is present, a blocking signal KB is formed which prevents switching operation request commands KA and KE from being passed on.

The signals of the position indicating contacts for all switching devices SW of the high-voltage switching station, stored in memory K, are logically combined via a control program stored in a memory P with data which are stored in a memory T and relate to the topological configuration of the high-voltage switching station. In this context, topological elements describing the current operational state are formed which are temporarily stored in a memory AT. The topological elements stored in the memory AT are then called up via the control program provided in the memory P and are logically combined with error-protected switching interlocking rules which, independently of the stored topological arrangement of the high-voltage switching station, are stored in a memory V. In this arrangement, the release or the blocking of a switching operation request command KA, KE possibly present is allocated to each switching device of the high-voltage switching station and this allocation, designated as release pattern, is stored in a memory F.

The error-protected switching interlocking rules are based on a basic set of topological elements which can be allocated to any arbitrary switching station. They make it possible to determine a release or a blocking of the switching operation request command KA, KE for each of its switching devices, independently of the topological configuration of this arbitrary switching station. In this context, it is advantageous, in view of a change of the error-protected switching interlocking rules, which may be desired for reasons of operating philosophy, to store rules concerning the operational reliability of the switching station and the behavior of the switching devices during a switching process and/or during an undetermined switching state, in a memory portion VS and, independently of this, to store, in a part memory VP, rules which relate to the operating philosophy and, for example, increase the operational reliability of the switching station during undetected and unintentional changes in potential, always provide the possibility of selectively switching a feeder by means of a circuit breaker and/or always make it possible to maintain prescribed switching sequences.

A switching operation request command KA, KE for one of the switching devices, present at the data acquisition and data processing unit, is either released or blocked after interrogation of the release pattern so that an error-free switching operation request command KF to the switching device selected is present at the output of the data acquisition and data processing unit.

The basic set of topological elements is selected in such a manner that all switching states are simulated and that they can be used for describing all the error-protected switching interlocking rules. The topological elements therefore represent states and characteristics which are relevant to interlocking such as, for example, equality of potential (current link), level of potential (active, passive, earthed) and adjacency (for example, relationships between adjacent switching devices and feeders).

The topological elements are listed in the Tables 1 and 2 and are subdivided into topological primitives and topological compounds of the topological primitives.

TABLE 1

Figure 3:
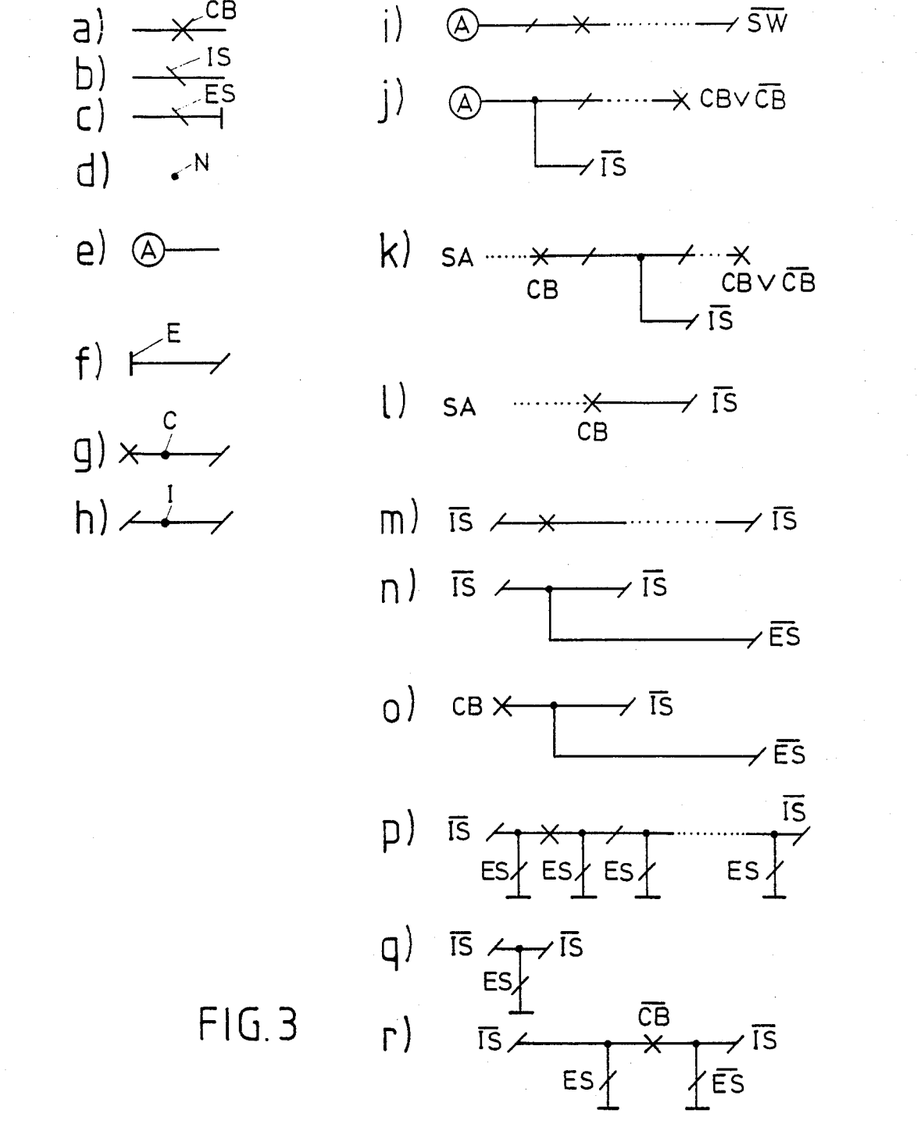
FIG. 3 is a graph of a basic set of topological elements forming the basis of the method according to the invention.

| Designation | Topological Description | | Graphical Representation |
|---|---|---|---|
| | | Substation Components | |
| SW | Edge in the single-line diagram of a switching station | Switching device (CB, IS, ES) | |
| CB | | Circuit breaker | FIG. 3, a |
| IS | | Isolator | FIG. 3, b |
| ES | | Earthing switch | FIG. 3, c |
| N | Node in the switching station single line diagram | Non-disconnectable electrical conductors | FIG. 3, d |
| | Boundary node | Open end in the single-phase diagram | |
| A | Active boundary node, i.e. node to which energy can be applied independently of the position of the switching device of the substation | Power transformer, reactor, line | FIG. 3, e |
| E | Earthed boundary node | Earthing point. Can be connected to the switching station by ES | FIG. 3, f |
| C | Circuit breaker node | Node connected to a CB and IS | FIG. 3, g |
| I | Isolator node | Node connected to IS and ES | FIG. 3, h |

| | | Boundary | |
|---|---|---|---|
| | | Switching Device | Boundary Node |
| S | Sequence of nodes and edges | SW | A, E | see below |
| SA | Active sequence i.e. live sequence containing at least one active boundary node | SW | A | FIG. 3, i |
| SAF | Active sequence of the feeder type, i.e. a part of SA begins at an active boundary node and ends at the open isolator or the first open or closed circuit | IS CB v CB | A | FIG. 3, j |

TABLE 1-continued

| Designation | Topological Description | | Graphical Representation |
|---|---|---|---|
| | breaker occurring | | |
| SAB | Active sequence of busbar type, i.e. a part of SA is bounded by open isolators or the first circuit breaker occuring; at least one circuit breaker must be closed for equipotential bonding | IS CB v CB CB | — FIG. 3, k |
| SAC | Active sequence of circuit breaker node type, i.e. SAB only | CB IS | — FIG. 3, l |
| SP | Passive (isolated) sequence, i.e. a sequence without active or earthed node | SW | — see below |
| SPM | Passive sequence containing more than one node | SW | — FIG. 3, m |
| SPI | Passive sequence containing only one isolated isolator node | IS ES | — FIG. 3, n |
| SPC | Passive sequence containing only one isolated circuit breaker node | IS,ES CB | — FIG. 3, o |
| SE | Earthed sequence, i.e. sequence containing at least one earthed and no active node | SW (sic) | E see below |
| SEM | Earthed sequence containing more than one node (excepting SEI); all earthing switches closed | IS | E FIG. 3, p |
| SEI | Earthed sequence containing only one node | CB, IS | E FIG. 3, q |
| SEC | Release switch, open earthed circuit breaker | IS ES | E FIG. 3, r |
| SU | Sequence containing at least one switching device of undefined state | SW | A, E — |

Generally, therefore, an open switching device SW can be contained in two different topological elements (with the exception of the element SEC) which are arranged in each case at one of the two switch connections. If the switching device SW is a part of a loop, both topological elements correspond to each other. A closed switching device SW is always contained in a single topological element.

The boundaries of all topological primitives are fixed. The topological compounds have either fixed lengths or their lengths change during the switching. The former, therefore, determine local characteristics, that is to say, adjacency relationship (SPI, SPC, SEI, SEC), and the latter determine characteristics of the overall system.

The error-protected switching interlocking rules can now be specified with the assistance of the topological elements defined above and are listed in the Table 3 which follows.

TABLE 3

| Group | Rule No. | Device | Command | Topology change and index condition |
|---|---|---|---|---|

TABLE 3-continued

| 1. Safety | | | | |
|---|---|---|---|---|
| Avoidance of damage to equipment and hazards for personnel | 11 | SW | Close | SA + SE → |
| | 12 | IS | Close | $SA_i + SA_j →$ $i ≠ j$ |
| | 13 | IS | Open | $SA → SA_i + SA_j$ $i ≠ j$ |

| Rule No. | Description of topology change | Reason for interlocking |
|---|---|---|
| 11 | Connection of live section to earthed section | Earth fault results in damage |
| 12 | Connection of two different live sections by isolator | Avoidance of load switching by isolators |
| 13 | Splitting a live section by isolator | |

| Group | Rule No. | Device | Command | Topology change and index condition |
|---|---|---|---|---|
| 2. Reality | | | | |
| Behavior during undetermined (temporary) and/or unknown states | 21 | SW | Operate | R → |
| | 22 | SW | Close | S + SU → |
| | 23 | SW | Open | SU → |

| Rule No. | Description of topology change | Reason for interlocking |
|---|---|---|
| 21 | No further switching allowed if switching device is operating | Avoid interaction between two switching processes |
| 22 | Connection between any section and a section with unknown state | In the case of unknown states, switching should be avoided because of possible risk |
| 23 | Opening of a switching device arranged in a section with unknown state | |

| Group | Rule No. | Device | Command | Topology change and index condition |
|---|---|---|---|---|
| 3. Fault Effect Limitation | | | | |
| Minimizing the risk in the case of undetected and unintentional potential changes | 31 | IS | Close | (a) SA + SPM → (b) SA + SPI → |
| | 32 | IS | Close | |
| | 33 | CB | Close | SE + SP → |
| | 34 | IS | Close | S + SEC → |
| | 35 | ES | Close | SE + SPM → |
| | 36 | ES | Open | SEM → |

| Rule No. | Description of topology change | Reason for interlocking |
|---|---|---|
| 31 | Connection of a live and an isolated section which is not an isolated circuit breaker node | Earth fault via isolator with isolated section which is earthed in reality |
| 32 33 | Connection of an earthed and an isolated section | Transfer of earth potential should be avoided |
| 34 | Connection of an earthed section to an incompletely earthed circuit breaker | Only with non-existant circuit breaker surge withstand capacity |
| 35 36 | Connection of an earth point to an isolated section which is larger than a single point | Only isolated points should be connected to earth |

| Group | Rule No. | Device | Command | Topology change and index condition |
|---|---|---|---|---|
| 4. Selectivity | | | | |
| Always ensure selective switching of a feeder by having | 41 | CB | Close | $SAF_i + SAF_j →$ i j |
| | 42 | IS | Close | $SAF_i + SAB_j (SAF_i v SAF_K) →$ |

TABLE 3-continued

| | Rule No. | Device | Command | |
|---|---|---|---|---|
| one circuit breaker at the end of a feeder protection zone | 43 | CB | Close | $i \neq K$ $SAF_i + SA8_j$ $(SAF_i) \rightarrow$ |
| | 44 | CB | Open | $SAB_i \rightarrow (SAB_i + SAB_j)$ |

| Rule No. | Description of topology change | Reason for interlocking |
|---|---|---|
| 41 | Connection of two different feeder type sections by circuit breaker | Avoid using more than one circuit breaker for one feeder |
| 42 | Connection of a feeder type section to a busbar type section not or not only bounded by the same feeder type section. | There should be one circuit breaker for each feeder |
| 43 | Connection of a feeder type section to a busbar type section is permitted if it is bounded only by the same feeder type section | Loops should be avoided with two circuit breakers, i.e. one current path should only be interrupted by one circuit breaker. |
| 44 | Opening a busbar type loop containing only one circuit breaker by the circuit breaker | With one circuit breaker, opening of a loop resulting in a current path containing only isolators should be avoided |

| Group | Rule No. | Device | Command | Topology change and index condition |
|---|---|---|---|---|
| 5. Switching Sequence | | | | |
| Unnecessary switching sequences should be avoided | 51 | CB | Close | $S + SPC \rightarrow$ |
| | 52 | IS | Open | $SA \rightarrow S + SAC$ |

| Rule No. | Description of Topology Change | Reason for interlocking |
|---|---|---|
| 51 | Connection of any sections to an isolated circuit breaker node by the circuit breaker | Maintain switching sequence. When opening: First circuit breaker, then isolator When closing: First isolator, then circuit breaker |
| 52 | Generation of a live circuit breaker node by opening an isolator | |

In Table 3, ij designates topological elements which are arranged on both sides of the switching device to be operated. It can be immediately seen by checking that the error-protected switching interlocking rules defined by means of the topological elements can withstand all requirements. They are independent of the set-up of any arbitrary switching station. In addition, additional rules can be added or certain ones of these rules can be canceled without having to change the rules already in existence.

When carrying out the method according to the invention, first the topological configuration of the switching station is stored. This task can be handled by a computer (host computer) into which the topological primitives such as nodes and switching devices present in the single-line diagram of the switching station are entered. During this process, the nodes are consecutively numbered and their relationships to adjacent nodes are established.

Figure 4:
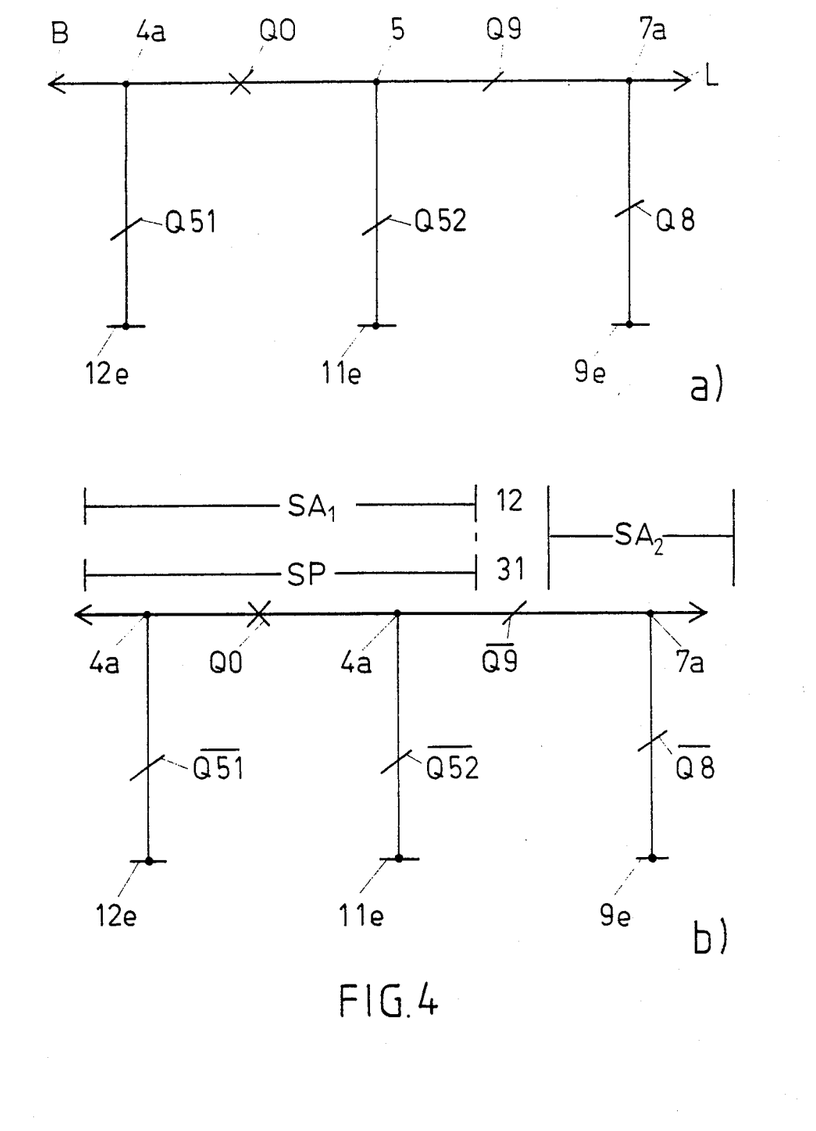
FIG. 4 shows a single-line diagram of a feeder of the high-voltage switching station specified in FIG. 1, with the aid of which a topological configuration of the feeder is shown at (a) and the current operating state of this feeder is shown at (b).

In the case of the feeder I specified in the single-line diagram of FIG. 4(a), the topological configuration is covered, for example, by the fact that the nodes are marked by reference symbols 4, 5, 7, 9, 11 and 12, that the switching devices are specified which establish the relationship between adjacent nodes such as a circuit breaker Q0 between nodes 4 and 5, an isolator Q9 between nodes 5 and 7 and one earthing switch Q51, Q52 and Q8 each between nodes 4 and 12, 5 and 11 and 7 and 9, and that, finally, the electrical condition of boundary nodes is specified by additional markings such as, for example, a for active and e for earthed like, for example, the active state of nodes 4 and 7, due to the busbar B and the line L, and the earthed state of nodes 9, 11, 12, respectively.

Using the current signals of the position indicating contacts of all switching devices of the high-voltage switching station, the current operational state of the feeder, established by topological elements, can then be determined which is graphically shown in FIG. 4(b). In this diagram, crossbars above the designations show that the isolator Q9 and the earthing switches Q51, Q52 and Q8 are open. In contrast, the circuit breaker Q0 designated without a crossbar is closed.

The determination of the current operational state of the feeder I starts from a boundary node having known electrical characteristics, for example, the earthed node 12, and proceeds to the next node, for example 4. In this procedure, the position indicating signal of the earthing switch Q51 is taken into consideration and by this means, and the position indication of the circuit breaker Q0, the electrical state of node 4 is determined. This also takes into account whether some switching device is just performing a switching operation or whether it has been indicated as not being available. All nodes stored during the acquisition of the topological configuration of the feeder I are successively called and their electrical state is determined in corresponding manner. As specified in FIG. 4, the current operational state of feeder I determined in this manner contains active topological elements, for example a sequence $SA_1$ or SP which comprises the circuit breaker Q0 and the busbar B and is bounded by the open earthing switches Q51 and Q52 and the open isolator Q9, which is active as the busbar B is live and is then designated by $SA_1$ and which is passive as the busbar is isolated and is designated by SP, and an active sequence $SA_2$ comprising the line L and bounded by the earthing switch Q8 and the isolator Q9.

Using the assistance of these topological elements, a check can now be performed with the aid of the stored error-protected switching interlocking rules by interrogating whether a switching operation request command to one of the switching devices Q0, Q9, Q51, Q52 and Q8 is to be released or to be blocked. Thus, rules 12 and 31 show that, for example, the open isolator Q9 must not be closed and rule 11 shows that the earthing switches Q51, Q52 and Q8 must not be closed. In contrast, the circuit breaker Q0 may be opened.

In this manner, a blocking or releasing state is allocated to each switching device. If therefore a switching operation request command is issued to one of these switching devices, this command is released or blocked depending on the characteristic of the topological elements allocated to this switching device.

Figure 5:
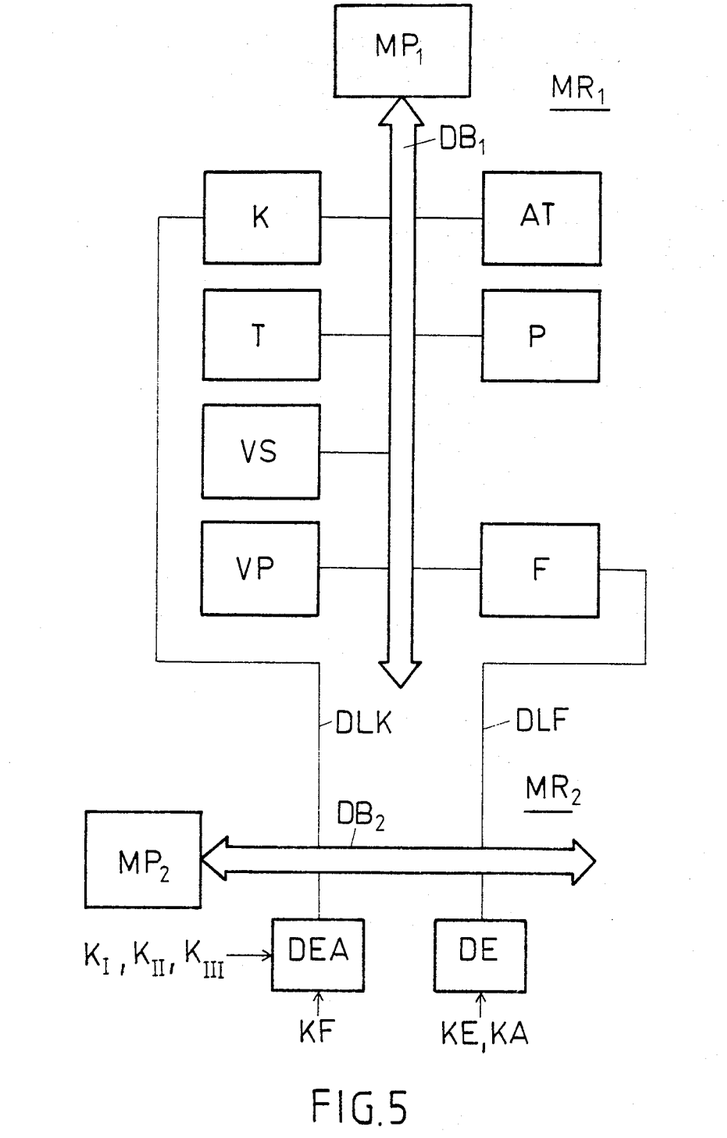
FIG. 5 shows a block diagram of two microcomputers for implementing the data flow chart of FIG. 2.

FIG. 5 shows a preferred device for carrying out the method according to the invention described above. The device shown in FIG. 5 comprises two microcomputers $MR_1$ and $MR_2$ which communicate with each other via two data lines. The computer MR$_1$ is provided with a central databus DB$_1$ which is connected to a microprocessor MP$_1$ and to the memory K for receiving the signals of the position indicating contacts K$_I$, K$_{II}$, K$_{III}$ of the switching devices of the high-voltage switching station, to the memory T for receiving the topological configuration of the high-voltage switching station, to the part memory VS for receiving the mandatory rules, to the memory portion VP for receiving the rules dependent on the operational philosophy of the high-voltage switching station, to the memory AT for receiving the topological elements establishing the current operational state of the high-voltage switching station, to the memory P for receiving the control program and to the memory F for receiving the release pattern. In this arrangement, the memories K, AT and F are preferably constructed as RAMs, the memories VS and R are preferably constructed as PROMs and the memories T and VP are preferably constructed as EPROMs.

The computer MR$_2$ is provided with a central databus DB$_2$ to which are connected a microprocessor MP$_2$ and a data input and data output device DEA and a data input device DE. The signals of the position indicating contacts K$_I$, K$_{II}$ and K$_{III}$ of the switching devices SW of the high-voltage switching station are entered via the data input and data output device DEA and are conducted via the databus DB$_2$ and the data line DLK into the memory K of the microcomputer MR$_1$ where they are stored. In the manner described above the release pattern of the switching devices of the high-voltage switching station, stored in the memory F, is determined from the position indicating signals stored in the memory K and from the information items stored in memories T, VS and VP. This release pattern passes via the data line DLF to the microcomputer MR$_2$. In this microcomputer, an error-free switching operation request command KF, which is passed to the switching device concerned via the data input and data output device DEA, is determined from the release pattern and a switching operation request command KE and KA present and supplied via the data input device DE.

What is claimed is:

1. A method for carrying out error protected switching operations for a switching station having a plurality of nodes and switching devices between adjacent nodes, comprising the steps of:
   storing data signals which contain information relating to all the nodes, and, for each node, the electrical state of bordering nodes which border on said each node;
   establishing a topological configuration for the switching station;
   storing a set of error-protected-switching interlocking rules which are based on and applicable to a basic set of topological elements and which are effective for establishing all operating states of any switching station of any arbitrary configuration, said interlocking rules being independent of said topological configuration of said switching station;
   repeatedly interrogating position indicating contacts associated with said switching devices for determining the contact status of said switching devices;
   temporarily storing signals received from the interrogation of said position indicating contacts;
   logically combining said stored signals of said position indicating contacts with data signals which represent said topological configuration of said switching station and generating from said combination topological elements which belong to a basic set of topological elements and establishing an operating state for said switching stations;
   temporarily storing said topological elements;
   interrogating said stored error-protected-switching interlocking rules on the basis of said temporarily stored topological elements and generating from said interrogation a release pattern indicating a releasing or blocking status for each of said switching devices;
   temporarily storing said release pattern; and
   interrogating said temporarily stored release pattern by and with a requested switching operation command and releasing or blocking said requested switching operation command based thereon in order to generate an error-free-switching operation command.

2. A method as in claim 1, wherein said topological elements comprise topological primitives and topological compounds of said topological primitives.

3. A method as in claim 2, wherein said method is applicable to switching devices such as circuit breakers, isolators, and earthing switches, non-disconnectable nodes such as electrical connecting lines, boundary nodes such as transformers, reactors, lines, earthing points and connecting nodes between a circuit breaker and an isolator and between an isolator and an earthing switch, said switching devices forming topological primitives; said switching station having sequences of nodes and switching devices such as active sequences containing at least one live active node, further sequences containing at least one earthed and no active node, passive sequences without active and earthed nodes and undefined sequences containing at least one switching device of undefined states and said sequences forming topological compounds.

4. A method as in claim 1, wherein said interlocking rules include rules which are based on mandatory rules which operate on the basis of the operational reliability of a substation and the behavior of the switching devices during a switching process and/or during an undetermined switching state; and
   rules which are based on an operating philosophy and are formed in a manner which is effective to increase the operational reliability of the substation during undetected or unintentional potential changes, the operating philosophy rules providing for selective switching of a feeder by means of a circuit breaker and/or the rules being effective to maintain prescribed switching sequences.

5. An apparatus for attaining error-protected-switching of a switching station having a plurality of nodes and switching devices between adjacent nodes, comprising:
   means for storing first data signals representative of each of said nodes and said switching devices as well as of bordering nodes which border on given ones of said nodes, said first data signals establishing a topological configuration for said switching station;
   means for temporarily storing second signals received from position indicating contacts, said second signals being indicative of the contact status of each of said switching devices;
   means for logically combining said first signals establishing said topological configuration of said switching station with said second signals for generating therefrom topological elements belonging to a basic set of topological elements, said basic set of topological elements being effective for defining all operating states of any switching station of any arbitrary configuration;

means for temporarily storing said topological elements;

means for storing a set of error-protected-switching interlocking rules which are applicable to said basic set of topological elements;

means for interrogating said error-protected-switching interlocking rules by means of said temporarily stored topological elements for generating a release pattern, said release pattern indicating a released or blocked status respectively for each of said switching devices;

means for temporarily storing said release pattern; and means for interrogating said temporarily stored release pattern by means of a requested switching operation command for generating an error-free-switching operation command.

* * * * *